Patented June 26, 1951

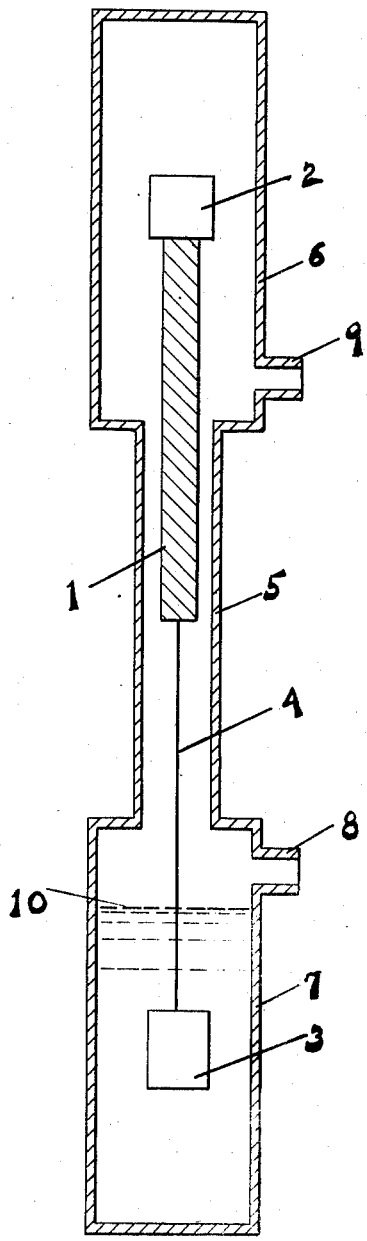

2,558,356

UNITED STATES PATENT OFFICE 2,558,356

PRESSURE CONTROL DEVICE

David H. Greene, Los Angeles, Calif., assignor to Danciger Oil & Refining Company, Fort Worth, Tex., a corporation of Texas Application December 2, 1946, Serial No. 713,597

2 Claims. (Cl. 138—45)

This invention relates to a control mechanism and more particularly to a pressure control device.

As is known, there are many systems involving flow of a fluid medium where it is essential or desirable to maintain a constant pressure on the section of the system to which the fluid is introduced regardless of the fluctuations or variations in the flow of the medium at the inlet. The present invention relates to an eminently simple and economical pressure control unit of high precision in which control of the pressure is immediate and direct. The novel unit operates on the principle of an orifice of constant cross-sectional area and of freely variable length, the variation in length controlling the rate of flow of the fluid and ultimately controlling the pressure.

In order to clearly explain the principle of operation of the new control unit a diagrammatic physical embodiment is shown in the single figure of the accompanying drawing.

The novel control unit, as will be observed, is of eminent simplicity. It comprises essentially a rod 1 of uniform diameter, as shown, which is suitably weighted by means of the weight 2 at its upper portion and a weight 3 suspended by the wire 4 from its lower section. The rod 1 operates in a casing comprised of the tube 5 of a predetermined diameter and the associated tubes or chambers 6 and 7. The chamber or tube 7 is provided with the fluid inlet opening 8 and the chamber or tube 6 is provided with the fluid discharge opening 9.

In this structure a fluid medium such as a gas discharged from a tower, reaction vessel, or the like, the pressure on which it is desired to be controlled, enters inlet 8 and flowing through the annular channel or orifice, established between rod 1 and tube 5, is discharged through outlet 9. As shown in the drawing, the lower chamber or tube 7 is substantially filled with a liquid such as a suitable oil up to the level 10 below the inlet 8.

The operation of this unit will be apparent from the description of this essential structure. The weights 2 and 3 serve to adjust the effective weight of the vertically movable rod 1 and also function to limit or dampen longitudinal vibrations of the rod, thus increasing the accuracy of response. As will be appreciated, the device functions as a control unit by reason of the dynamic pressure drop between inlet 8 and outlet 9 which results from the flow of fluid through the area between tube 5 and rod 1. This drop in pressure is constant and is equal to the net weight of rod 1 and associated weights 2 and 3 divided by the cross-sectional area of the rod. In operation when the fluid entering inlet 8 and being discharged from outlet 9 remains constant in rate the rod 1 remains in a stable suspended position. In these circumstances fluid is continuously being discharged from outlet 9 at a given constant pressure, i. e., the inlet pressure at inlet 8 minus the pressure drop in the conduit 5. If now the pressure of the fluid entering inlet 8 should rise as, for example a surge or increase in the rate of flow of the fluid therein, then, due to such increase in pressure, the rod 1 rises to some definite amount which is proportional to such rise in pressure of the inlet fluid. To the extent that the rod 1 rises the effective length of the orifice, i. e., the annular channel defined between the tube 5 and rod 1, will be commensurately shortened. This permits the fluid to flow through the unit at a greater rate and thus with proper design of the device exactly counteracts the tendency for the pressure to rise. Conversely the rod 1 will descend or fall in the unit to exactly counteract a tendency for the pressure to decrease.

It will be appreciated that the range of the device, that is the maximum and minimum rates between which the unit will operate to control pressures, may be varied and is determined by a number of factors such as; the length and diameter of the rod 1 and the tube 5, the weight of the rod 1 and its associated weights 2 and 3, the surface characteristics of the rod such as its coefficient of friction and the properties of the particular fluid flowing through the unit. These factors may be varied and correlated by those skilled in the art to establish the desired range of the instrument. For example, the rod 1 may be provided with a smooth or a roughened surface. The roughness of the surface may be random such as is established by sandblasting or it may be orderly as could be obtained for example, by turning a thread over a portion or over the entire length of the rod.

The efficiency of a device embodying the principles of the invention was established by constructing a control unit. A solid steel rod 1, 12 inches long and .25 inch in diameter was treated to establish a number of depressions .002 inch deep and .125 inch wide. These depressions were uniformly disposed over the whole length of the rod at the rate of four per inch.

This rod or plug was inserted in a steel tube 5 which was 12 inches long and of 0.3 inch interior diameter. As is shown in the drawings, a weight 3, which comprised a short section of a steel bar was connected to the lower end of the rod through the medium of a suspension wire 4. The tube 5 was attached to two 13 inch lengths of standard 0.5 inch pipe to provide the chambers 6 and 7 and inlet opening 8 and outlet opening 9 were provided in these respective chambers close to the junctions of the chambers with the casing or tube 5. As shown in the drawings, the extreme ends of chambers 6 and 7 were closed off.

The lower chamber 7 was then filled with limpid oil to the level 10, just below the inlet port 8. The adjustment weight 3 thus was completely immersed in the pool of oil. The control unit, as thus assembled was connected in a system through which natural gas was flowing. The inlet 8 was connected to the natural gas supply line and the outlet 9 was connected to a tower maintained at atmospheric pressure. During the tests the flow of the natural gas was varied within the range of from 40 to 130 cubic feet per hour. It was ascertained that regardless of the rate of flow within this range the discharge pressure of the system was automatically maintained at 15 p. s. i. gauge.

It is particularly to be observed that pressure at which the system was maintained was in precise agreement with the pressure calculated from the weight and cross-sectional area of the rod 1. In the control unit constructed as herein defined, the weight or rod 1 plus associated adjustment weights 2 and 3, was 0.736 pound. The diameter of the rod, as previously noted, was 0.25 inch and hence the cross-sectional area was 0.0491 square inch. As explained previously, the pressure drop between inlet 8 and outlet 9 is constant and is equal to the net weight of the rod, 0.736 pound, divided by the cross-sectional area, 0.0491 square inch, which gives a pressure of 15.0 pounds per square inch.

Further tests were made to establish the general utility and efficacy of the novel control unit. For example, the unit described was installed on a system through which acetylene was passing at a rate of flow varying from 30 to 90 cubic feet per hour. As in the test previously described, it was found that the pressure at outlet 9 was held at 15.0 pounds per square inch with a high degree of constancy and with immediate response.

While the above described tests were conducted using gases as the fluid medium the improved control device is operable with equal efficiency for controlling the pressure on liquids. Tests which were carried out utilizing the described unit for controlling the outlet pressure on liquids such as gas oil and water, displayed the same general efficiency as those conducted on gases.

It will be understood that the control unit may be varied in size and design to most effectively adapt it to a particular installation or system in which it is to be used. The unit shown in the drawing is simplified to more clearly illustrate the operative principles involved. In commercial construction the chambers 6 and 7 preferably are detachable from the orifice tube 5 or are provided with removable plates so as to permit removal or replacement of weights 2 and 3 to adjust the pressure drop in the control valve to the particular desired value. It will be understood that variations in the range of control may similarly be established by utilizing a series of plugs or rods 1 of different cross-sectional area; in other words, the two determining factors, namely, the cross-sectional area of the rod 1 and the net weight of the rod may be varied to establish a wide permissive pressure control range for the unit.

The unit may be fabricated of suitable materials of construction such as bar steel stock, stampings and the like, of carbon or corrosion resistant alloy steels as the requirements of a particular use dictate. The tube 5 may be provided with a sight glass to permit visual inspection of the position of the rod 1, or, if desired, and when the characteristics of fluid permit, the tube 5 may be constructed of a suitable transparent plastic. Where the exigencies of a particular operation require, the interior of tube 5 or the lower internal section of chamber 6 may be provided with spacer arms or spiders to maintain the rod 1 in centering position in the tube 5 and thus insure a uniform annular tolerance between the internal surface of the orifice or tube 5 and the rod or plug 1.

It is evident that the pressure control valve embodying the principles of the invention is not only eminently simple in design and construction but inherently presents a high sensitivity. The essential pressure controlling movement involves a vertical movement of the hydrodynamically sustained rod or plug 1 which movement involves no mechanical contact and hence no mechanical frictional lag or loss.

While a typical embodiment of the invention has been described it will be appreciated that this has been reduced to the ultimate simplicity to more strikingly illustrate the fundamental principles and mode of operation of the control unit. Variations in design of the unit as well as the multitudinous specific uses to which the novel unit may be applied are considered to be comprehended within the broad scope of the invention as herein defined. The novel control device may be considered as an intrument which controls the pressure on a processed fluid medium. As is known, much of the fluctuation in a processed fluid medium is due to previous variations or fluctuations in the processing or introduced medium, as charged through line 8 for example. The present device compensates, and in a sense anticipates such fluctuations in the inlet or processing medium to establish a desired and constantly maintained uniform pressure in the processed medium.

I claim:

1. A pressure control device for delivering a fluid medium at a constant predetermined pressure comprising, a vertically positioned tubular orifice of fixed length, an inlet chamber and an outlet chamber communicating with the orifice and through which the fluid medium passes, a cylindrical member of predetermined cross-sectional area positioned within and spaced from the walls of the orifice, a weight suspended in a liquid medium maintained in the inlet chamber, means to connect such suspended weight to the cylindrical member, the cylindrical member being responsive, by vertical displacement, to variations in the rate of flow of the entering fluid medium to correspondingly vary the effective length of the orifice to thereby maintain a constant pressure on the fluid entering the orifice.

2. A device in accordance with claim 1 in which means comprising replaceable weights are provided to increase or decrease the net weight of the cylindrical member.

DAVID H. GREENE.

REFERENCES CITED

The following references are of record in the file of this patent:

UNITED STATES PATENTS

| Number | Name | Date |
|---|---|---|
| 47,184 | Bishop | Apr. 11, 1865 |
| 1,564,246 | Kelly | Dec. 8, 1925 |
| 1,871,287 | Whittaker | Aug. 9, 1932 |
| 2,096,202 | Richeson | Oct. 19, 1937 |
| 2,341,259 | Baldwin | Feb. 8, 1944 |
| 2,344,943 | Gooden | Mar. 28, 1944 |